United States Patent [19]

Cohn

[11] 3,948,831
[45] Apr. 6, 1976

[54] DYEABILITY OF POLYESTER TEXTILE FIBER

[75] Inventor: Gerald Cohn, Akron, Ohio

[73] Assignee: The Goodyear Tire & Rubber Company, Akron, Ohio

[22] Filed: Nov. 14, 1969

[21] Appl. No.: 877,045

[52] U.S. Cl. .................. 260/22 R; 8/168 C; 8/179; 8/DIG. 4; 260/22 D; 260/22 T; 260/26; 260/30.6 R; 260/30.8 R; 260/32.4; 260/40 R; 260/75 S; 260/75 T; 260/75 N
[51] Int. Cl.$^2$ .................. C08G 63/12; C08G 63/76
[58] Field of Search ........ 260/22 D, 22 A, 75, 75 T, 260/40 P; 8/115.5, 179, 168

[56] References Cited
UNITED STATES PATENTS

| | | | |
|---|---|---|---|
| 2,647,104 | 7/1953 | Shivers | 260/75 |
| 2,998,296 | 8/1961 | Hennemann | 8/115.5 |
| 3,022,131 | 2/1962 | Selle et al. | 8/115.5 |
| 3,115,475 | 12/1963 | Griehl | 260/22 |
| 3,135,577 | 6/1964 | Watson | 8/115.5 |
| 3,185,671 | 5/1965 | Horn | 260/75 |
| 3,223,658 | 12/1965 | Kraft et al. | 260/22 |
| 3,235,520 | 2/1966 | Crowell | 260/22 |
| 3,251,913 | 5/1966 | Richards et al. | 264/78 |
| 3,313,590 | 4/1967 | Delano et al. | 8/55 |
| 3,396,128 | 8/1968 | Matumoto et al. | 260/22 |
| 3,480,378 | 11/1969 | Taube et al. | 8/39 |
| 3,483,218 | 12/1969 | Marrable | 260/40 |
| 3,494,882 | 2/1970 | Andrews | 260/22 |
| 3,507,835 | 4/1970 | Stackman et al. | 260/75 |
| 3,528,947 | 9/1970 | Lappin et al. | 260/75 |

FOREIGN PATENTS OR APPLICATIONS

| | | | |
|---|---|---|---|
| 242,756 | 1/1963 | Australia | 260/75 |
| 549,419 | 11/1957 | Canada | 260/22 |

*Primary Examiner*—Ronald W. Griffin
*Attorney, Agent, or Firm*—F. W. Brunner; J. M. Wallace, Jr.

[57] ABSTRACT

Polyesters modified with acid or basic dyestuff acceptors suffer from low intrinsic viscosities and low melting points. By the present invention an insoluble, thermally stable surfactant overcomes the above shortcomings when such surfactant is incorporated into the polyester before, after, or preferably during polymerization.

3 Claims, No Drawings

DYEABILITY OF POLYESTER TEXTILE FIBER

This invention relates to incorporating nonionic, anionic and/or cationic surfactants into polyesters to improve dyeability and to give filaments and fibers of high intrinsic viscosity and of a color which is deeper in shade than the color obtained when a surfactant is not employed. The surfactant must be insoluble and be thermally stable. It may be incorporated into a polyester or copolyester before, after, or preferably during condensation polymerization.

The polyesters useful in accordance with the present invention are cold-drawing, linear, highly polymerized esters of terephthalic acid and at least one glycol of the formula $HO(CH_2)_nOH$, where $n$ is an integer of from 2 to 10. Suitable copolyesters used in the invention may comprise ethylene terephthalate-ethylene isophthalate copolyesters as described in U.S. Pat. No. 2,965,613 to Milone et al and/or certain other copolyesters more fully described hereinafter.

In producing polyalkylene terephthalates there is involved the interaction of at least two molecular proportions of glycol (preferably ethylene glycol) per molecular proportion of terephthalic acid with the splitting out of water. Subsequent heating of the resulting glycol ester of terephthalic acid at about 250° to 280° C. under 0.05 to 20 millimeters of mercury pressure absolute results in the production of high polymer with the splitting out of glycol which is removed from the reaction mixture.

Preferably highly polymeric polyalkylene terephthalates are produced by heating terephthalic acid bodies, such as esterforming derivatives of terephthalic acid with at least one glycol. Suitable ester-forming derivatives are aliphatic or aromatic esters of terephthalic acid such as $C_1$ to $C_4$ alkyl esters and/or aryl esters such as those from phenol, cresols and the like. The preferred derivatives are methyl and ethyl terephthalates.

In this latter, preferred procedure, first there is a transesterification reaction (or ester interchange reaction) to low polymer with the evolution of alcohol. Subsequently, upon heating at about 250° to 280° C. under 0.05 to 20 millimeters of mercury absolute pressure there is a polycondensation reaction to high polymer with splitting out (and removal) of glycol. Each reaction is preferably catalyzed. Zinc diacetate and other known catalysts are employed to speed up the transesterification reaction and antimony oxide or other known catalysts are employed to promote the subsequent polycondensation reaction.

Insofar as the preparation of ethylene terephthalate-ethylene isophthalate copolyesters is concerned, it is along lines previously described and is described in detail in U.S. Pat. No. 2,965,613 (supra).

Other suitable copolyesters may be employed in the practice of the invention. For example, polymers derived from cyclohexane dimethylol terephthalate are useful as is polyethylene-2,6-naphthalate, as well as, in general, copolyesters containing terephthalic acid and other acids which contain, based on total acid, at least 75 mol percent of terephthalic acid. An example of such a copolyester is one of at least one glycol, terephthalic acid and dimer acid as described in U.S. Pat. No. 3,390,108 to Keck et al.

In accordance with the invention the surfactant is added before, during or after ester interchange. The amount of surfactant added is 0.005 to 5.0 percent, preferably about 0.01 to 2.0 percent based on dimethyl terephthalate.

The surfactants in accordance with the present invention may be nonionic, anionic or cationic in nature. The typical surfactants include, among others, alkyl, alkaryl ethers and thioethers, as well as certain esters and amides. Also contemplated within the scope of nonionic surfactants are nonionic surfactants of the following formulae:

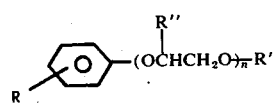

wherein R, R', and R'' are hydrogen, alkyl, aryl or aralkyl and $n$ is 1 to 50;

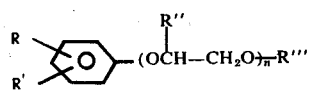

wherein R, R', R'' and R''' are hydrogen, alkyl, aryl or aralkyl and $n$ is 1 to 50;

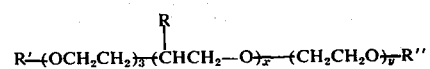

wherein R, R' and R'' are hydrogen, alkyl, aryl or aralkyl and $x$ is 1 to 50 and $y$ is 1 to 50;

wherein R, R' are hydrogen, alkyl or alkaryl;

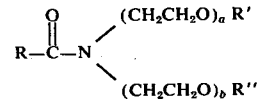

wherein R, R' and R'' are hydrogen, alkyl or alkaryl.

Typical anionic surfactants include, among others, carboxylic acid soaps, fatty acids, rosin, naphthenic acids, alkyl sulfates, alcohols and olefins, sulfated oils and esters, sulfated amides and ethers, alkyl sulfenamides, sulfonated amides and ethers, phosphates, sulfamides, alkali metal salts of polymerized naphthalene sulfonic acids, alkali metal salts of polymerized naphthalene sulfonic acids, Group II metal salts of polymerized aralkyl sulfonic acids, metal salts of polymerized substituted benzoalkyl sulfonic acids, and the like.

Also useful for the purposes of the present invention are cationic surfactants which may be, among others, simple amine salts, aminoamides and imadazolines and/or especially quaternary ammonium salts. Other cationic surfactants within the purview of the present invention may have the formulae listed below:

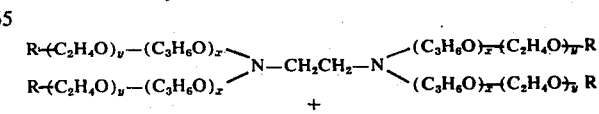

-continued $$[R-(C_2H_4O)_y(C_3H_6O)_z]_3N$$

wherein R is hydrogen, alkyl or aralkyl.

In order to more fully illustrate the present invention the following experimental data are given.

Example 1

A polymerization reactor fitted with condenser, stirrer and vacuum take off was charged with 50 grams dimethyl terephthalate, 40 grams ethylene glycol, 250 milligrams of potassium salt of polymerized naphthalene sulfonic acids and 10 milligrams zinc acetate.2-$H_2O$. The transesterification reaction was conducted at 244° C. (refluxing diethylene glycol at atmospheric pressure). Initially all of the salt dissolved but precipitated as the transesterification proceeded. After 1 hour 21 cubic milliliters of methanol distilled. Fifteen (15) milligrams of antimony trioxide was added and polycondensation was started with stirring at 280° C. Vacuum was reduced slowly to 0.6 millimeter. After 1 hour the polymer was removed.

Example 2

A reactor fitted with condenser, stirrer and vacuum take off was charged with 50 grams dimethyl terephthalate, 40 cubic milliliters ethylene glycol, 10 milligrams zinc acetate.$2H_2O$. The transesterification reaction mixture was heated with 240° C. vapor bath. After 1 hour 21 milliliters of methanol had distilled. Fifteen (15) milligrams antimony trioxide was added and 4 milliliters of potassium salt of polymerized naphthalene sulfonic acid dispersion was prepared in Example 3 with stirring. Polycondensation reaction was started at 280° C. Vacuum was reduced in increment down to 0.6 millimeter. At the end of 1 hour the polymer was withdrawn and it was determined that it would cold draw. A sample of the polymer was dyed in a boiling aqueous Rhodamine B (Color Index No. 45170) dye bath acidified with acetic acid and containing nonionic surfactant for 1.5 hours.

A control sample of pure polyethylene terephthalate polymer was dyed in the same dye bath. After aqueous scouring of both polymers with a surface dye at 50° to 70° C. in the presence of a nonionic surfactant for one-half hour, the potassium salt surfactant containing polymer was dyed and the control had resisted dye uptake.

Staple fiber prepared from this modified product was characterized by the following properties:

| | |
|---|---|
| Intrinsic viscosity | .595 |
| Carboxy Content, eq/$10^6$ g | 34 |
| Hydrolytic decomposition Percent Broken Bonds | .08 |
| Melting Point, Differential Thermal Analyzer, °C. | 256 |

This staple fiber was dyed with a disperse dyestuff (Dispersol Fast Scarlet T-ICI) to a deeper shade than the homopolymer (control) polyethylene terephthalate.

Example 3

One gallon pebble mill containing 10 pounds borundum cylinders was charged with 300 grams of the potassium salt of polymerized naphthalene sulfonic acids. The mill was turned for 8 hours to produce a dispersion.

Resort may be had to the modifications and variations of the disclosed embodiments without departing from the spirit of the invention or the scope of the appended claims.

What is claimed is:

1. A polyester composition having improved dyeability consisting essentially of a mixture of linear thermoplastic fiber forming polyester resin and from 0.005 to 5 percent based on the polyester resin of at least one surfactant which is insoluble in the polyester resin and is stable in polyester under polycondensation conditions in the form of a dyed fiber.

2. A polyester composition having improved dyeability consisting essentially of a mixture of linear thermoplastic fiber forming polyester resin wherein the polyester consists of a major proportion of combined alkylene terephthalate groups and from 0.005 to 5 percent based on the polyester resin of at least one surfactant which is insoluble in the polyester resin and is stable in polyester under polycondensation conditions in the form of a dyed fiber.

3. A polyester composition having improved dyeability consisting essentially of a mixture of linear fiber forming polyester resin and from 0.005 to 5 percent based on the polyester resin of at least one nonionic surfactant which is insoluble in the polyester resin and is stable in polyester under polycondensation conditions.

\* \* \* \* \*

UNITED STATES PATENT AND TRADEMARK OFFICE
CERTIFICATE OF CORRECTION

PATENT NO. : 3,948,831
DATED : April 6, 1976
INVENTOR(S) : Gerald Cohn

It is certified that error appears in the above-identified patent and that said Letters Patent are hereby corrected as shown below:

In Column 3, Line 1, formula is:

should be:

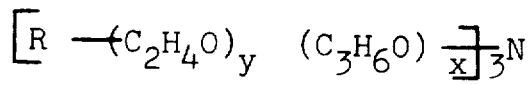

Signed and Sealed this

Seventeenth Day of October 1978

[SEAL]

Attest:

RUTH C. MASON
Attesting Officer

DONALD W. BANNER
Commissioner of Patents and Trademarks